United States Patent [19]
Castelli et al.

[11] Patent Number: 5,978,788
[45] Date of Patent: Nov. 2, 1999

[54] SYSTEM AND METHOD FOR GENERATING MULTI-REPRESENTATIONS OF A DATA CUBE

[75] Inventors: Vittorio Castelli, White Plains; Anant Deep Jhingran, Elmsford; Chung-Sheng Li, Ossining; John Timothy Robinson, Yorktown Heights, all of N.Y.

[73] Assignee: International Business Machines Corporation, Armonk, N.Y.

[21] Appl. No.: 08/843,290

[22] Filed: Apr. 14, 1997

[51] Int. Cl.⁶ .................................................. G06F 17/30
[52] U.S. Cl. ......................... 707/2; 707/1; 707/3; 707/4; 707/104; 707/102
[58] Field of Search .................................. 707/102, 100, 707/200, 204, 2, 1, 3, 4, 104

[56] References Cited

U.S. PATENT DOCUMENTS

| | | | |
|---|---|---|---|
| 5,675,785 | 10/1997 | Hail et al. | 707/102 |
| 5,745,754 | 4/1998 | Legarde et al. | 707/104 |
| 5,761,652 | 6/1998 | Wu et al. | 707/2 |
| 5,799,300 | 8/1998 | Agrawal et al. | 707/1 |
| 5,832,475 | 11/1998 | Agrawal et al. | 707/2 |

OTHER PUBLICATIONS

DeFazio et al., "Database Extensions for Complex Domains", IEEE Proceedings of the 12th Int'l Conf. on Data Engineering, pp. 200–202, Feb. 26, 1996.
J.P. Stamen, "Structuring Databases for Analysis", IEEE Spectrum vol.30 Iss.10, p.55–58, Oct. 1993.
Jim Gray et al., "Data Cube: A Relational Aggregation Operator Generalizing Group–By, Cross–Tab, and Sub–Totals", IEEE, 1996, pp. 152–158.

*Primary Examiner*—Paul V. Kulik
*Assistant Examiner*—Greta L. Robinson
*Attorney, Agent, or Firm*—Kevin M. Jordan

[57] ABSTRACT

An apparatus and method for approximating the data stored in a databases by generating multiple projections and representations from the database such that the OLAP queries for the original database (such as aggregation and histogram operations) may be applied to the approximated version of the database, which can be much smaller than the original databases. Other aspects optimize a mapping, via a mapping (or dimension) table, of non-numeric or numeric attributes to other numeric attributes such that the error incurred on applying queries to the approximated version of the database is minimized. Still further aspects define boundaries of approximations so that the boundaries are preserved when approximated versions of the databases are generated.

29 Claims, 10 Drawing Sheets

FIG. 4

WEATHER (RELATIONAL TABLE)

| Time | LAT | LON | Altitude | Temp | Pressure |
|---|---|---|---|---|---|
| 20/09/96:1500 | 37:58:33 | 122:45:28 | 102 | 21 | 1008 |
| 20/09/96:1500 | 34:16:18 | 27:05:55 | 10 | 23 | 1024 |
| ....... | | | | | |
| 20/09/96:1500 | 30:58:33 | 17:58:33 | 50 | 22 | 1011 |

401 →

WEATHER (FACT TABLE)

| Time | LAT | LON | Altitude | Temp | Pressure |
|---|---|---|---|---|---|
| 0.0 | 0.00 | 0.00 | 0.00 | 22 | 1008 |
| .... | | | | | |
| 99.00 | | | | | |
| 100.00 | 90.00 | 180.00 | 10000.00 | 23 | |
| 101.00 | | | | | 1011 |

402 →

SYSTEM AND METHOD FOR GENERATING MULTI-REPRESENTATIONS OF A DATA CUBE

CROSS-REFERENCE TO RELATED APPLICATIONS

The present invention is related to co-pending patent application Ser. No. 08/726,889, entitled "Adaptive Similarity Searching in Sequence Databases," by Castelli et al., filed Oct. 4, 1996, IBM Docket No. YO996211. This co-pending application and the present invention are commonly assigned to the International Business Machines Corporation, Armonk, N.Y.

FIELD OF THE INVENTION

The present invention is related to an improved data processing system. A more particular aspect of the present invention is related to the application of decision support techniques such as online analytical processing (OLAP) to databases.

BACKGROUND

Decision support is rapidly becoming a key technology for business success. Decision support allows a business to deduce useful information, usually referred to as a data warehouse, from an operational database. While the operational database maintains state information, the data warehouse typically maintains historical information. Users of data warehouses are generally more interested in identifying trends rather than looking at individual records in isolation. Decision support queries are thus more computationally intensive and make heavy use of aggregation. This can result in long completion delays and unacceptable productivity constraints.

Some known techniques used to reduce delays are to pre-compute frequently asked queries, or to use sampling techniques, or both. In particular, applying online analytical processing (OLAP) techniques such as data cubes on very large relational databases or data warehouses for decision support has received increasing attention recently (see e.g., Jim Gray, Adam Bosworth, Andrew Layman, and Hamid Pirahesh, "Data Cube: A Relational Aggregation Operator Generalizing Group-By, Cross-Tab, and Sub-Totals", International Conference on Data Engineering, 1996, New Orleans, pp. 152–160) ("Gray"). Here, users typically view the historical data from data warehouses as multidimensional data cubes. Each cell (or lattice point) in the cube is a view consisting of an aggregation of interests, such as total sales.

Commonly encountered aggregation queries for data warehouse applications include those already defined in the standard Structured Query Language (SQL), such as the following five aggregate functions:

AVG( );
COUNT( );
SUM( );
MIN( );
MAX( );

Red Brick Systems added three more aggregate functions:

rank(expression): returns the expression's rank in the set of all values of this domain of the table. If there are N values in the column, the rank is N if the expression is the highest value, and the rank is 1 if the expression is the lowest value;

N_tile(expression, n): the range of the expression is computed and divided into n intervals of approximately equal population. The function returns the number of intervals holding the value of the expression; and Ratio_to_Total(expression): sums the expression and then divides the expression by the total sum.

Red Brick Systems also offers three cumulative aggregate functions:

Cumulative(expression): cumulative sums of values in an ordered list;

Running_sum(expression,n): sums the most recent n values in an ordered list; and Running_average(expression,n): averages the most recent n values in an ordered list.

In Gray, the aggregation concept is generalized to N-dimensional data cubes and the SQL query syntax is extended to support histograms, decorations, and CUBE operators. Creating the cubes requires generating the power set (set of all subsets) of the aggregation columns. If there are N attributes in the select list, there will be 2 N-1 super-aggregate values.

As discussed in Gray, the main techniques for computing the CUBE include:

minimizing data movement and consequent processing costs by computing aggregates at the lowest possible levels;

using arrays or hash tables to organize aggregation in memory;

if the aggregation values are large strings, using a hashed symbol table to map each string to an integer;

if the number of aggregates is too large to fit in memory, using sorting or hybrid hashing to organize the data by value and then aggregate with a sequential scan of the sorted data; and if the source data spans many disks or nodes, using parallelism to aggregate each partition and then coalesce these aggregates.

These techniques are generally useful, but lack the flexibility to deliver results in a progressive fashion. In other words, these techniques cannot stage the results to users, e.g., to provide approximate results at first and more accurate results later, as needed.

As discussed earlier, it is essential for data warehouse queries to be performed efficiently. Several approximation techniques can be used to either sample the original database records or the data cube to compute aggregation. Both random sampling and uniform sampling are the most obvious approaches. Both random sampling and uniform sampling techniques are well known in the art. Its application to database sampling can be found, for example, in "Random Sampling from Databases: A Survey" by F. Olken and D. Rotem (Statistical Computing, vol. 5, no. 1, March 1995, pp. 25–92). Similarly, uniform sampling techniques can be applied to a database to reduce the amount of information that must be processed. However, neither uniform nor random sampling allows the generation of a pyramid representation of the data cube, as the sampling rate is not linearly correlated with the accuracy. As a result, it is difficult to trade accuracy for speed when responding to queries.

Thus, there is a need for an improved method and system for generating multiple representations of a data cube for OLAP Applications. The system and method should provide the flexibility to deliver results in a progressive fashion and/or enable the trade of accuracy for speed when responding to queries. The present invention addresses such a need.

SUMMARY OF THE INVENTION

In accordance with the aforementioned needs, the present invention is directed to an improved apparatus and method for approximating the data stored in a database. The present invention has features for flexibly generating multiple projections and/or representations from the database such that OLAP queries for the original databases (such as aggregation and histogram operations) can be applied to the approximated (often smaller) version of the database (called data cubes).

The database can be converted into an initial data cube, such as a FACT table using well-known techniques. The present invention also has features which optimize the mapping of non-numerical or numerical attributes to other numerical attributes such that the error incurred on applying queries to the data cube is minimized.

A computerized method according to the present invention for generating multi-representations of a data cube includes the steps of splitting the data cube, which includes a plurality of lattice points, into a plurality of dimensions; generating multi-resolutions and/or multi-projections of the data cube, in response to the splitting step; and reconstructing the data cube from the multi-resolutions and/or multi-projections.

According to yet another feature of the present invention, if the generating step generates multi-projections of the data cube, the reconstructed data cube including the multi-projections can be stored for later synthesis. For example, in response a query on the reconstructed data cube at a selected resolution, the reconstructed data cube can be synthesized at the selected resolution.

Alternatively, multi-resolutions of the data cube can be synthesized from the multi-projections and stored. Here, the reconstructed data cube can be directly queried at a selected resolution.

In either case, results can be delivered to users in a progressive fashion. In other words, results can be delivered in stages, providing approximate results at first and more accurate results later, as needed.

The present invention has still other features which preserve the relative spatial integrity of the lattice points by defining boundaries of approximations so that the boundaries are preserved when approximated versions of the databases are generated.

BRIEF DESCRIPTION OF THE DRAWINGS

These and other features and advantages of the present invention will become apparent from the following detailed description, taken in conjunction with the accompanying drawings, wherein:

FIG. 4 depicts an example of a relational table and a corresponding FACT table;

DETAILED DESCRIPTION

Figure 1:
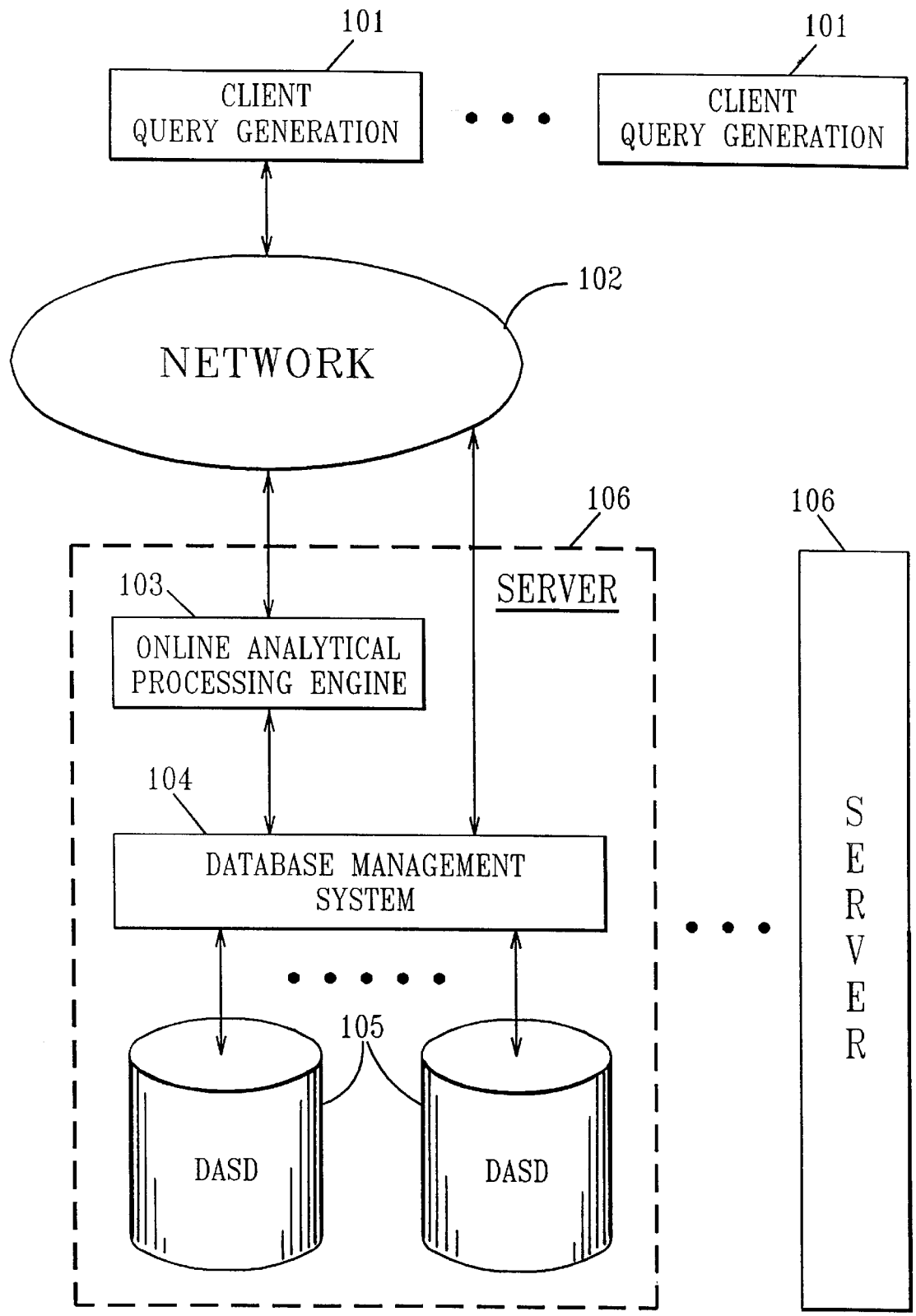
FIG. 1 depicts an example of a client/server architecture which generates decision support data for a database.

FIG. 1 depicts an example of a client/server architecture having features of the present invention. As depicted, multiple clients (101) and multiple servers (106) are interconnected by a network (102). The server (106) includes a conventional database management system (DBMS) (104) and direct access storage device (DASD) (105). A query is typically prepared on the client (101) machine and submitted to the server (106) through the network (102). The query typically interacts with the database management system (104) for retrieving data from or updating data in a database stored in the DASD (105). For example, the database can store the point-of-sale transactions of a supermarket. Decision support types of applications typically seek to discover knowledge or patterns from the stored data. According to the present invention, an online analytical processing (OLAP) engine (103) may be used to intercept queries that are OLAP related to facilitate their processing (details of the OLAP engine will be described below). Those skilled in the art will appreciate that OLAP engine and logic may alternatively reside on a server dedicated to OLAP tasks. In general, it is preferable to couple the OLAP engine close to the DBMS and DASD to maximize available pipe bandwidth.

Figure 2:
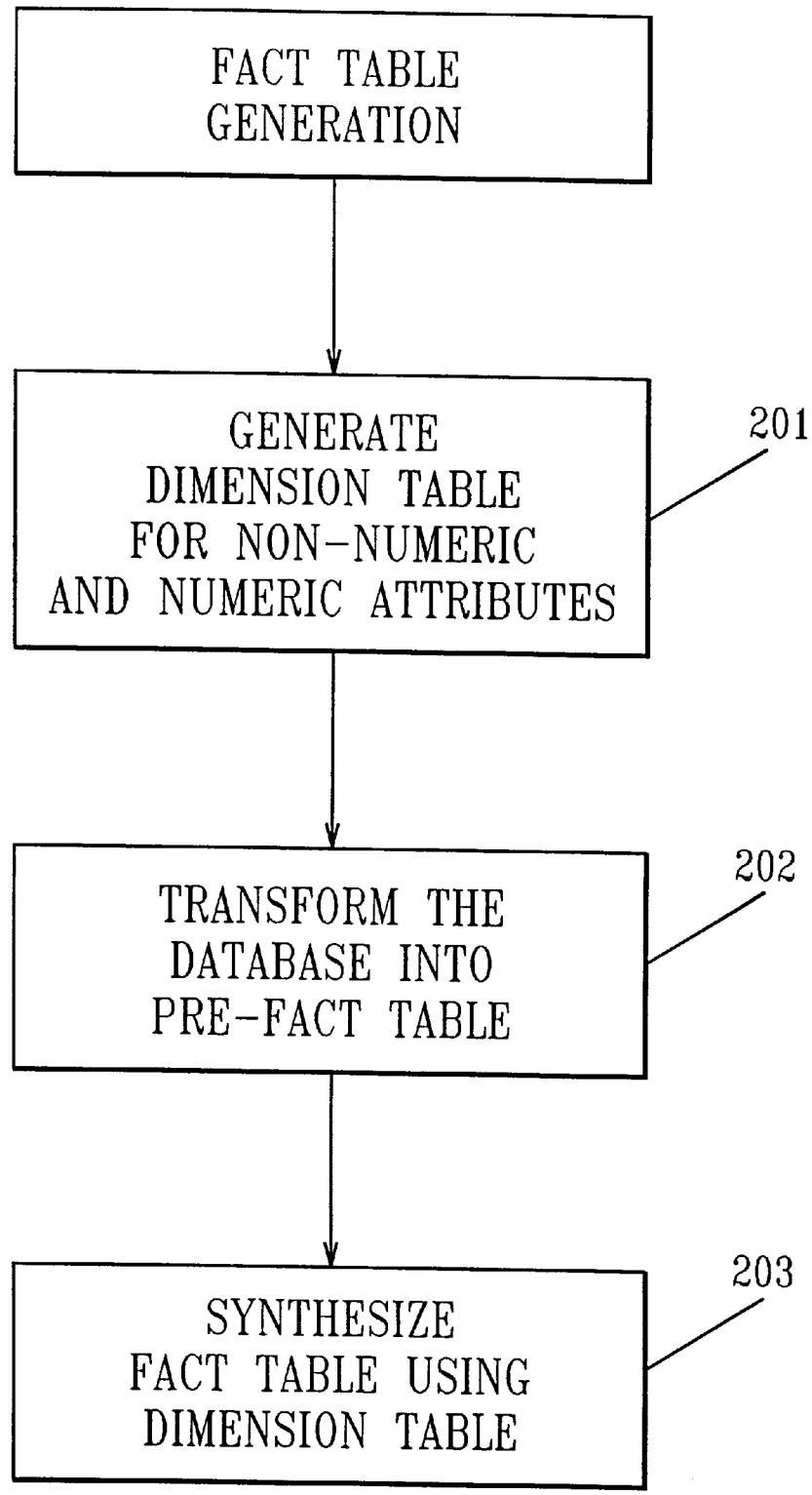
FIG. 2 depicts an example of a flow chart for generating a FACT table from the database which may include categorical data, non-numeric strings, and numeric data.

FIG. 2 depicts an example of a process for generating a FACT table from the database. The FACT table, can be used to assist with decision support queries. The attributes of a database can include non-numeric values such as names or sparse numeric values such as department codes. Thus, in step 201, a mapping table (also called a dimension table) can be generated to translate any non-numeric values or sparse numeric values into a contiguous range of numbers. In step 202, the dimension table is used to translate the original database into a pre-FACT table. At this point, the original database relation table (401) and the pre-FACT table have a one-to-one correspondence between their entries. In step 203, the pre-FACT table is synthesized into a FACT table (402). Note that if the range of the integer values v of the attributes a in a FACT table (a1, a2, a3) is [v11, . . . , v12], [v21, . . . , v22], [v31, . . . , v32], then there are a total of (v12-v11)(v22-v21)(v31-v32) entries in the FACT table. The generation of the FACT table is essential for synthesizing the data cubes to be used for OLAP operations. This is because, as will be discussed with reference to FIG. 4, there could be entries in the FACT table that do not exist in the original database.

Figure 3:
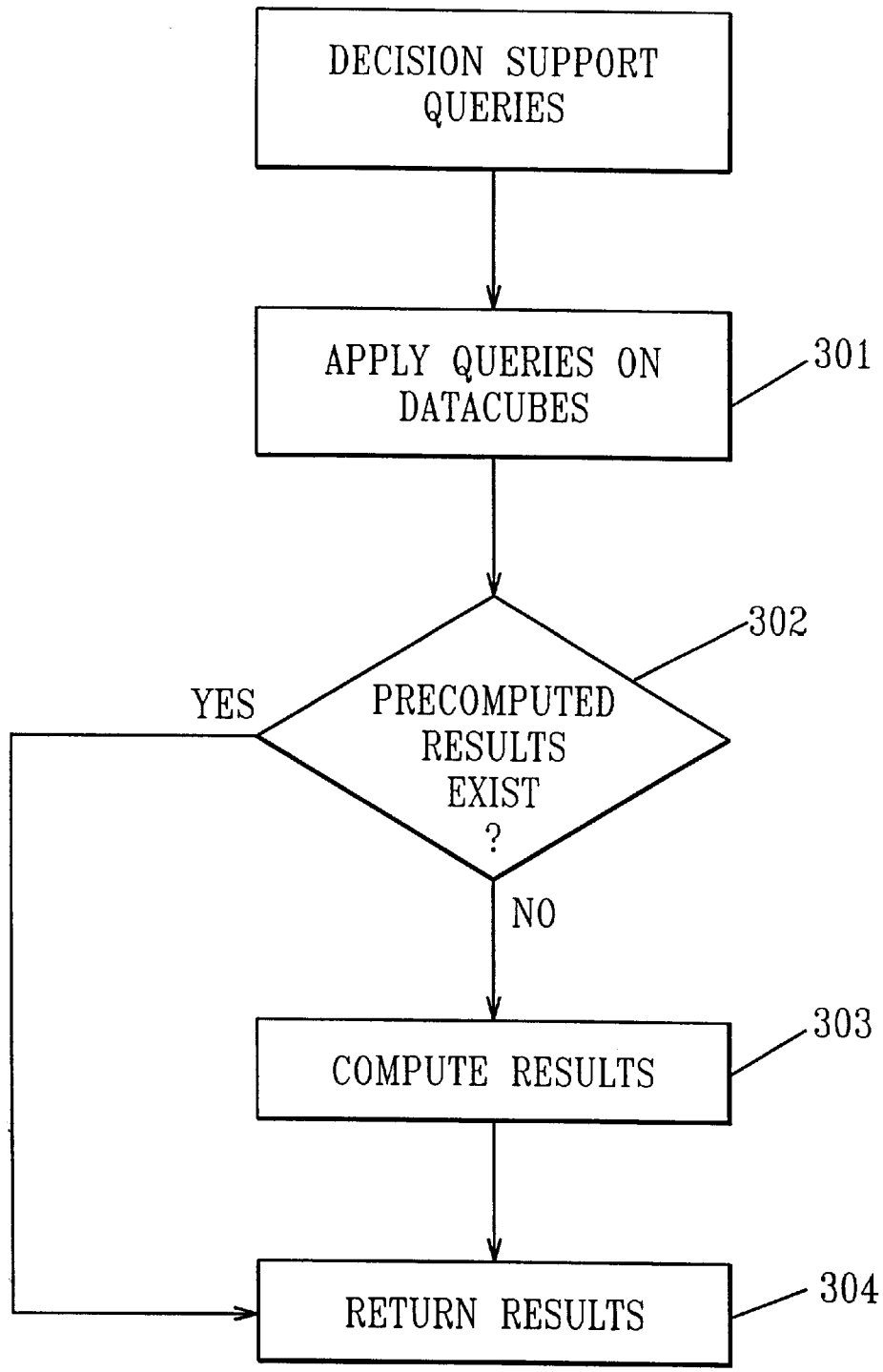
FIG. 3 depicts an example of a flow chart for performing decision support queries on CUBEs generated from the FACT table.

FIG. 3 depicts an example of a conventional method for processing decision-support types of queries. These queries, as discussed previously, can be categorized as aggregation or histogram types of operations and usually include constraints on the range of values of each attribute in the FACT table. As depicted, in step 301, since the FACT table can be viewed as a CUBE, the queries are applied to the CUBE. The translation of queries for a FACT table into queries for a CUBE is straightforward, as they have a one-to-one mapping. In step 302, it is determined if precomputed results exist for the query. In step 304, if the query can be addressed by the precomputed entries, then the precomputed results are returned to the client directly. In step 303, if there are no precomputed results, the operators will then be applied to the CUBE (or the FACT table) and the results are returned, in step 304.

For example, FIG. 4 shows a FACT table (402) and associated relational table (401). As depicted, the relational table (401) may contain 4-dimensional earth temperature data. The first four (left-hand) columns contain information on several time and space coordinates t, x, y, and z, while the remaining columns contain measurements at that point, such as temperature, and/or pressure, (shown for illustration only) and/or wind velocity, humidity, ozone density, etc. The measured values are usually aggregated over time (t), or space (x,y,z). In order to generate the FACT table, the attributes of the relational table are identified as Time, latitude(LAT), longitude(LON), and Altitude. The values for the attribute time is mapped to a value in an interval between 0.0 and 101.0, the latitude is mapped to a value in an interval between 0 and 180, and the longitude is mapped to a value in an interval between 0 and 90. Note that the mapping is one-to-one and reversible. However, additional empty entries might have to be created. For example, not all the time values between 0.0 and 101.0 necessarily have corresponding attribute values in the relational table. Similarly, not all the values in the valid ranges of latitude, longitude or altitude necessarily have valid entries in the original table. Thus, the FACT table can be much larger than the original table.

Figure 5:
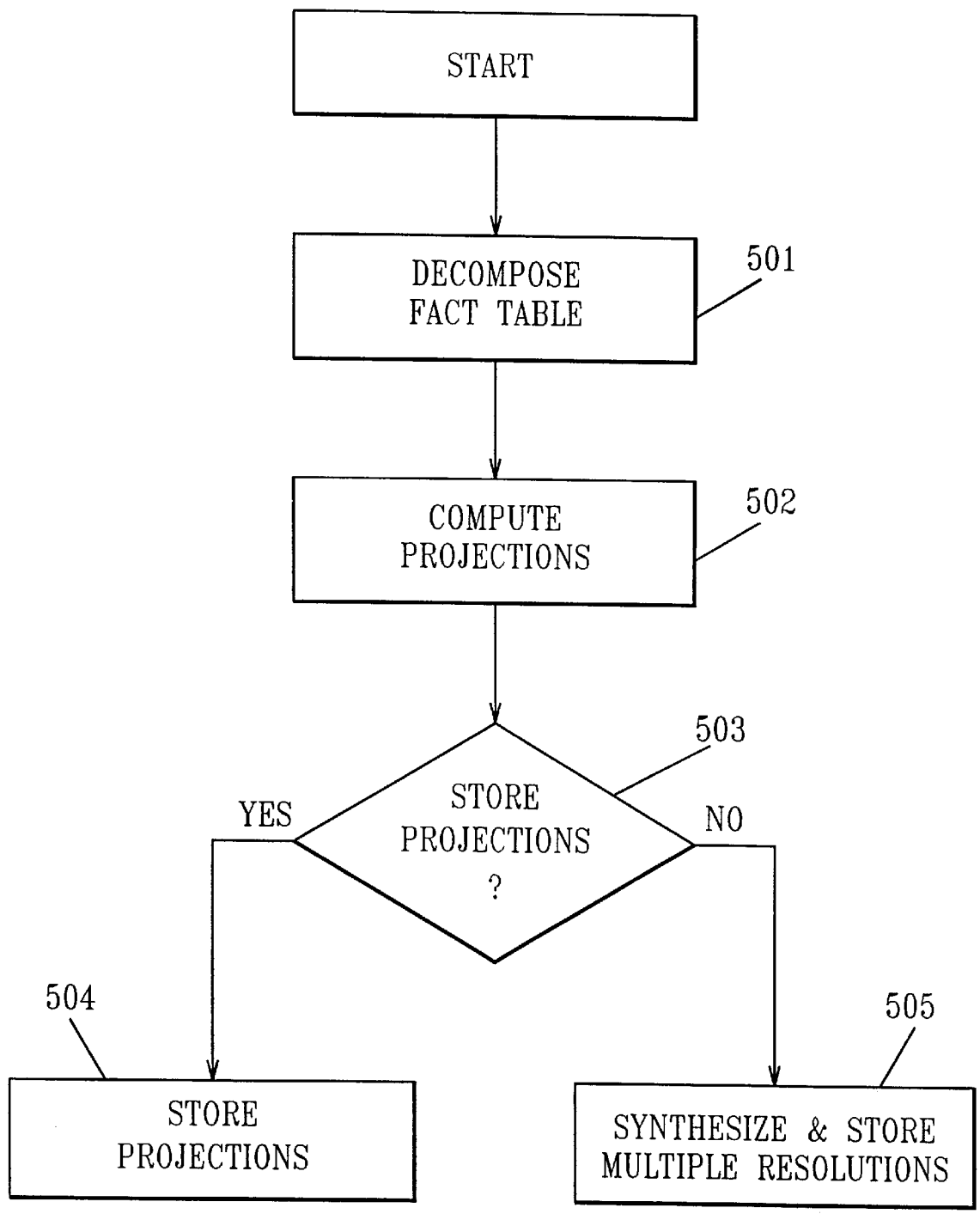
FIG. 5 depicts an example of a flow chart for generating multiple representations of the FACT table.

FIG. 5 depicts an example of a mult-resolution technique having features of present invention for producing multiple representations for approximation of a data cube. By way of overview, a data cube includes a plurality of lattice points which can be considered as N tuples, each of which has the format: $(x_1, x_2, \ldots, x_I, y_1, y_2, \ldots, y_J)$ where $x_i$, which is in the range $[a_i, b_i]$, can assume $d_i$ distinct values. It is assumed that non-numerical values or sparse numerical values have been converted to this format already via the dimension table (or mapping table) described earlier. As depicted, in step 501, the FACT table is decomposed into J tables, such that the tuples of the j-th table have the format: $(x_1, x_2, \ldots, x_I, y_j)$ where $1 \leq J$. In step 502, transformation techniques (such as wavelet transformations) can be applied to the J tables to produce multi-projection and multi-resolution representations of the original table. Next, the data cube is reconstructed from the J tables. Using discrete wavelet transformations to transform a two-dimensional image into multiple projections and resolutions is well-known in the signal processing art (see e.g., "A Theory For Multiresolution Signal Decomposition—The Wavelet Representation," by Stephane G. Mallat, IEEE Transactions on Pattern Analysis and Machine Intelligence, vol. 11, No. 7, July 1989). Most of these transformations (including wavelet transformations) are linear and separable.

According to the present invention, these (linear and separable) functions can be independently applied to each individual dimension of the data cube. Preferably, a separable filter function f[i] is applied along each dimension of the table followed by a decimation (or down sampling) along that dimension. This ensures that the transformation does not contaminate the information in the original data. Moreover, after the transformation, the total number of dimensions of the table is preserved. However, the resulting representation has $d_i^F$ for the i-th dimension. Note that $d_i^F \leq d_i^I$. The transformed entries can be expressed as $(x_1, x_2, \ldots, x_I, y_j)$ where $1 \leq j \leq J <= J$.

After applying the filter function on a first dimension (denoted as resolution level $(0, 0, \ldots, 0)$) of the original table, a lower resolution level $(1, 0, 0, \ldots, 0)$ is generated from the decimated version of the filtered table. Note that the lower resolution representation of the original database is generated by the application of the linear function before a uniform sampling (or decimation) is applied. Otherwise, aliasing will occur when sampling is applied directly to the table. Aliasing is a well-known phenomenon when the sampling frequency is less than twice the frequency of the data. As a result, a filtering operation is usually necessary to reduce the frequency component of the data. This procedure can be applied to other dimensions independently, until a resolution level $(1, 1, 1, \ldots, 1)$ is reached. Still lower resolution representations of the original table can be generated by applying the same procedure recursively for each resolution level.

Next, the data cube is reconstructed from the J tables: $(x_1, x_2, \ldots, x_I, y_1^F, y_2^F, \ldots, y_J^F)$. This technique allows the compression of the data cube from $\Pi_{i=1}^{J} d_i^I$ to $\Pi_{i=1}^{J} d_i^F$. Thus, each individual dimension of the data cube can be compressed, thereby reducing the total amount of space required. As will be discussed in more detail with reference to FIG. 9, the relative spatial integrity of the lattice points in the reconstructed data cube can be preserved by enforcing semantic boundaries when the approximated versions of the database are generated.

Returning now to FIG. 5, in step 503, two storage options for the projections generated from the wavelet transformation are considered. In step 504, only the projections generated from the wavelet transformation are stored. One advantage here is the total amount of storage needed is identical to that needed for the original database. One drawback is that each resolution of the database must be synthesized during query time. In step 505, a more storage intensive but faster approach is to store multiple resolutions synthesized from the multiple projections. Here, although the total amount of storage required for storing these representations is increased, the computation speed is much faster.

Figure 6:
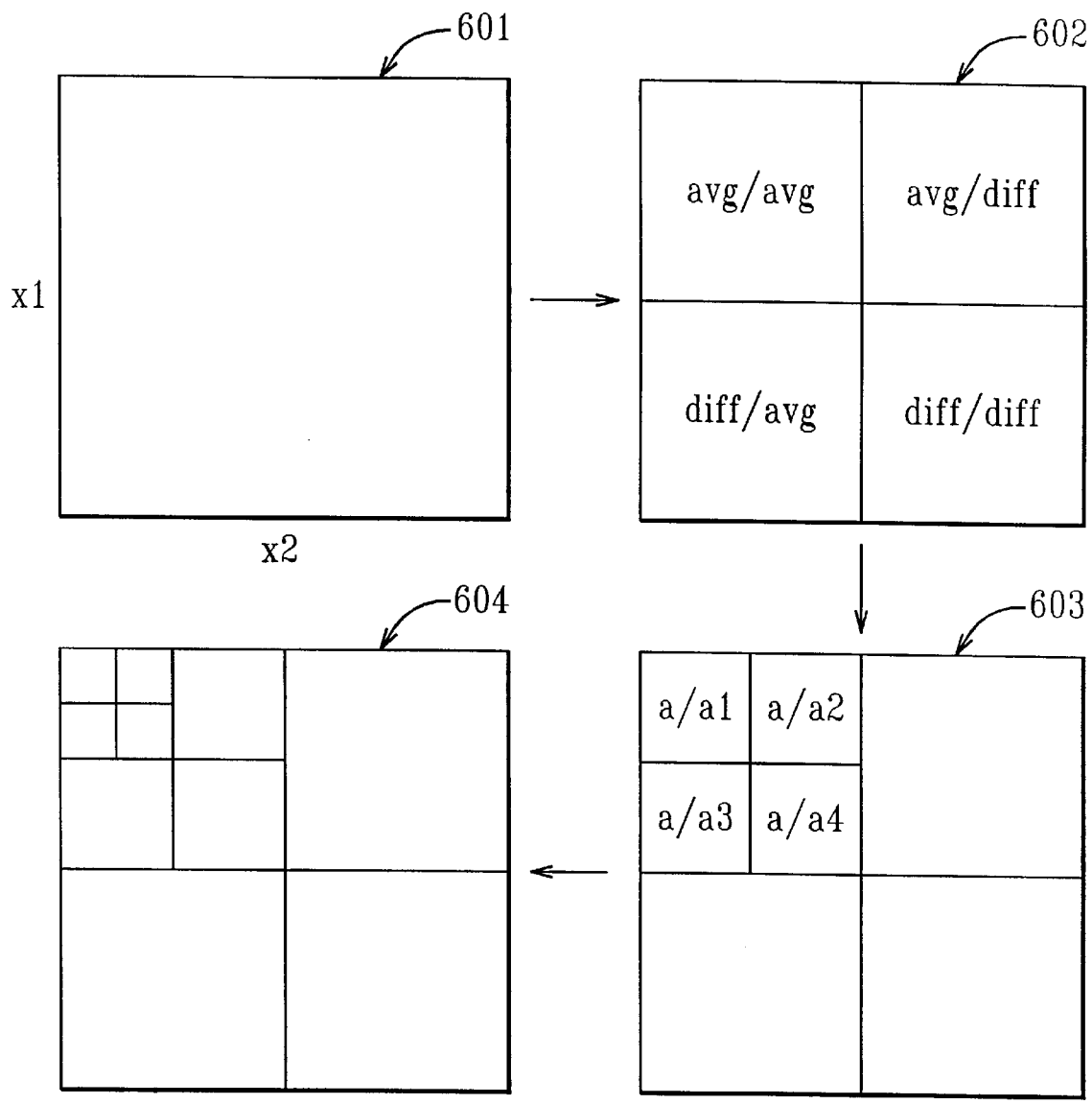
FIG. 6 depicts an example of the generation of multiple representations of a two-dimensional FACT table.

FIG. 6 depicts an example of the decomposition (step 501) and projection (step 502) of a two-dimensional FACT table. In step 601, the process begins with the two-dimensional FACT table depicted. In this example, a simple averaging and difference operation is assumed for the filtering operation. The averaging operation produces a low-pass version of the table while the difference operation produces a high-pass version of the table. In step 602, the table is passed through the averaging/difference filter, and the original FACT table is partitioned into four quadrants, representing the follow-pass, low/high-pass, high/low-pass, and high/high-pass versions of the original table. The low/low-pass version of the table can be generated by applying averaging along both dimensions of the FACT table. This procedure can be applied recursively in any of the quadrants. In step 603, for example, the operation is applied in the avg/avg quadrant. As shown, the avg/avg quadrant is thus decomposed into four quadrants (a/a1 . . . a/a4). In step 604, the upper left quadrant (a/a1) can then be further divided by applying the same procedure. This procedure can continue as long as each quadrant has at least four lattice points.

After the multiple resolution representation of the data cube is generated, OLAP operations can be applied to the approximated version of the cube as well as the original cube. Examples of the application of aggregation and histogram operations to the approximated versions of the data cube will be described with reference to FIG. 7.

By way of overview, aggregation operations usually involve the specification of a range: $u_1 \leq x_1 \leq v_1, \ldots,$ $u_j \leq x_j \leq v_j$. Different levels of accuracy can be obtained when the range-based aggregation is applied at different resolution levels. At lower resolutions, $x_i$ is no longer contiguous. For example, if $x_i$ assumes all values between 1 and 16 at the highest resolution, it will assume only the values 1, 3, 5, 7, 9, 11, 13, and 15 at a lower resolution level, and only 1, 5, 9, 13 at the next lower level, and so on. The larger the range specified for $x_i$, the lower the resolution that can be used for computing the aggregation such as AVG( ). For example, when the range is specified for $1 \leq x_i \leq 9$, the lowest resolution needed to compute AVG( ) is the fourth level, as the range boundary coincides with the decimation boundary. In contrast, the lowest resolution that can be used for the range query $2 \leq x_i \leq 10$, is level 3. Furthermore, an interpolation error is introduced by using the value at 1 and 9 to predict the actual value between 2 and 10. A range-based histogram estimation, however, is subject to more stringent conditions since a sufficient number of samples are needed in order to produce a meaningful histogram. For example, a 10 percent quantile requires at least 10 samples, while a 1 percent quantile requires at least 100 samples. This would impose an upper bound on the highest level (or lowest resolution) that the OLAP transaction can utilize.

Figure 7:
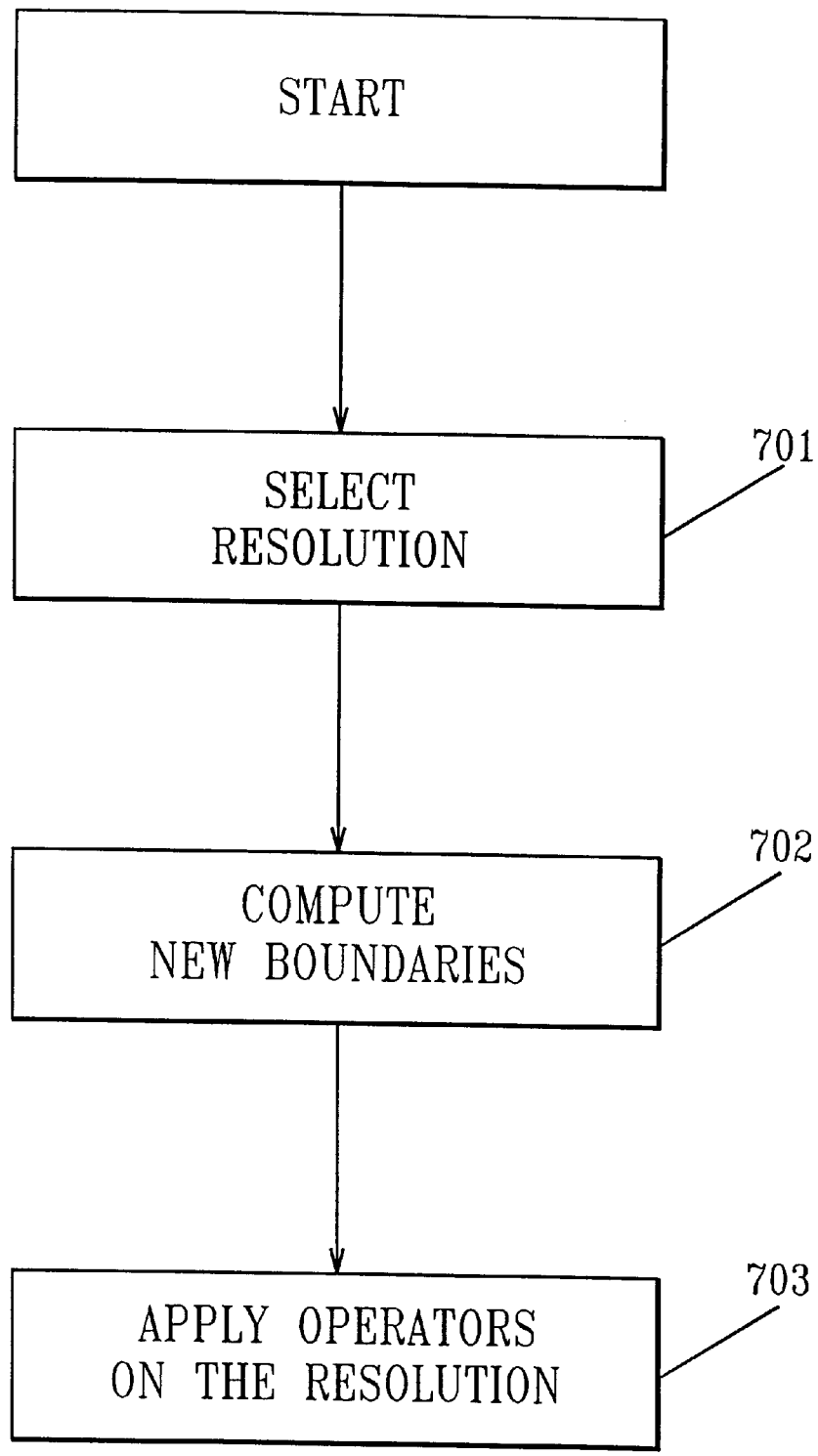
FIG. 7 depicts an example of a flow chart for performing decision support queries on multiple representations of the FACT table.

FIG. 7 depicts an example of a flow chart for flexibly applying OLAP queries to approximated versions of the data cube. As depicted, in step 701, an appropriate resolution level is selected. This can be determined by a number of factors such as a confidence level at each resolution and/or an error tolerance. For example, if a user (or application) can tolerate a larger error, a lower resolution version of the cube can be selected, resulting in faster performance. On the other hand, if the larger error cannot be tolerated, a higher resolution of the data cube (or even the original cube) can be selected. In step 702, after an appropriate resolution of the data cube is selected, the new boundaries of the range queries are computed against the selected resolution level. The operators may then be applied to the data cube in the same way as the operators were applied to the original data cube. Those of skill in the art will appreciate that generating approximated versions of the data cubes can be done in conjunction with other performace optimization techniques, such as precomputation of aggregations and commonly used queries.

Figure 8A:
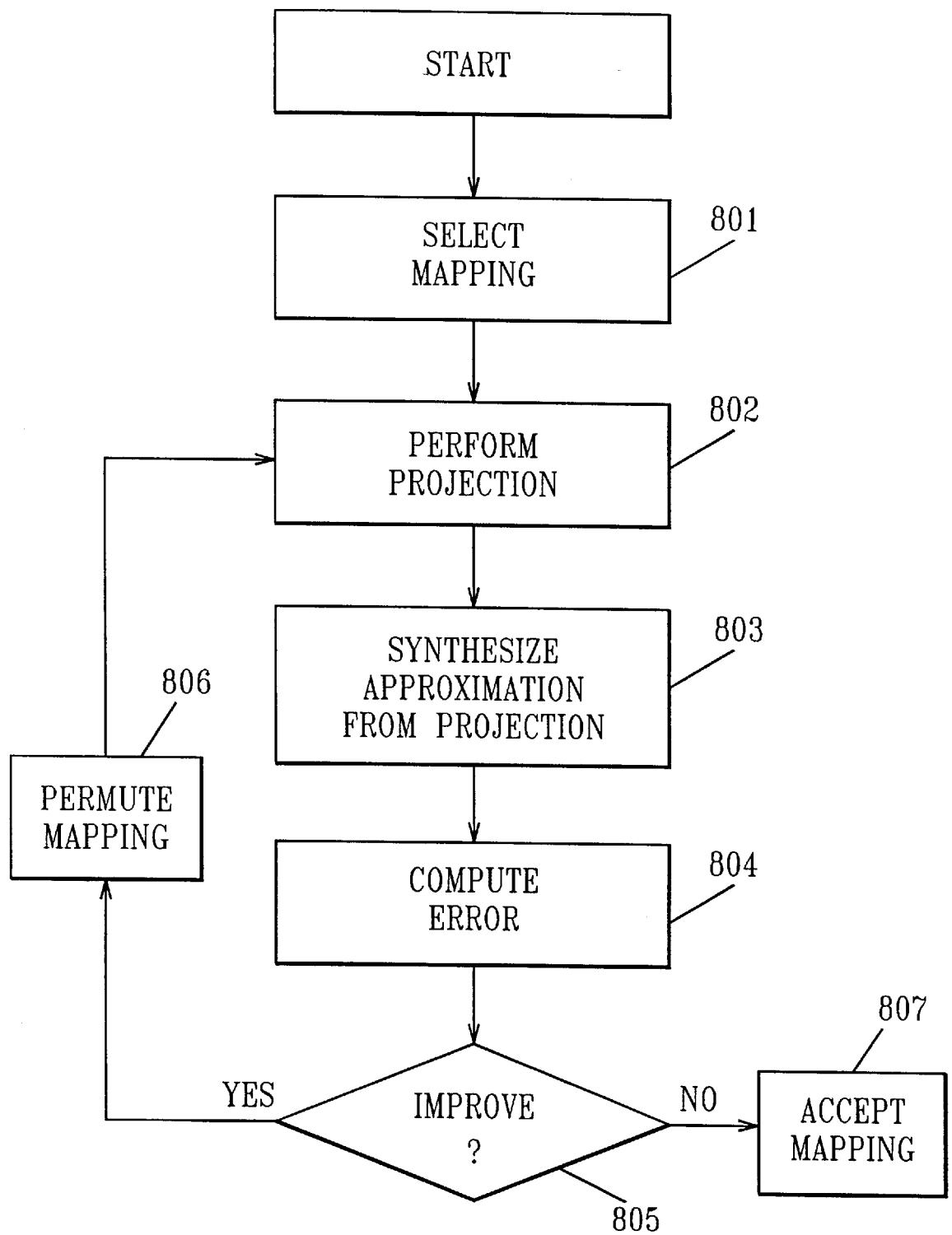
FIG. 8a depicts an example of a flow chart for generating a mapping table which minimizes the bandwidth in FACT table.

FIG. 8a depicts an example of a flow chart for generating a mapping table which minimizes the bandwidth in FACT table. This method may be used to reduce errors (which may result from the use of only a low pass version of the original FACT table) by altering the low pass version's sequence such that the bandwidth is minimized. Recall that the FACT table sequence can be generated by mapping the categorical or numeric data into other numeric data via a hash table. In principle, a hash table can be chosen such that the high frequency component of the data is minimized. Preferably, the mapping should be guided by the principle that data with similar values should be placed close to each other.

According to the present invention, in step 801 a more rigorous approach is to select a to reasonable mapping of the categorical/non-numeric data. For example, the mapping preferably should map entries having similar values to spatially adjacent points. In step 802, the projection is computed. In step 803, the approximated version of the data cube is synthesized. In step 804, a set of queries are applied and an error between the approximated version and the original version is computed. In step 806, if the error is less than that from a previous permutation of the mapping, the mapping is permuted and the process continues at step 802. The loop formed by steps 802–806 is repeated until in step 805, no permutations can generate better approximations. In this case, in step 807 the mapping is accepted. Note that this is a greedy heuristic algorithm to discover the best mapping algorithm. In general, this algorithm does not guarantee that the mapping obtained is optimal.

Figure 8B:
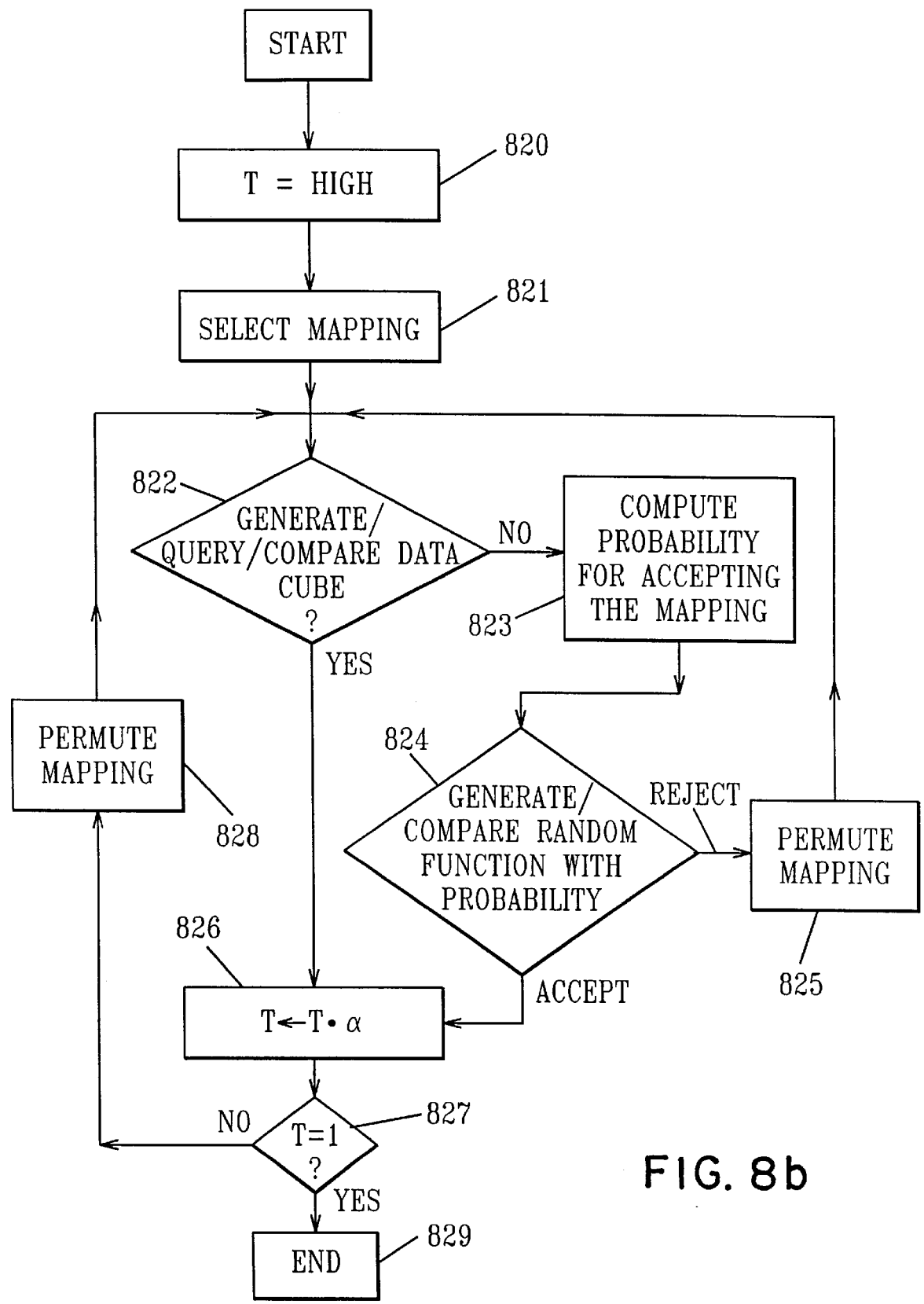
FIG. 8b depicts another example of a flow chart for generating a mapping table which minimizes the bandwidth in FACT table.

FIG. 8b depicts another example of a flow chart for generating a mapping table which minimizes the bandwidth in FACT table. Here, simulated annealing is used to ensure that this procedure is not trapped in a local optimum. The technique of simulated annealing is well-known in computer-aided design (CAD) for the placement and routing of the physical layout of integrated circuits. Simulated annealing provides a schedule for adjusting a control parameter which is analogous to lowering the temperature in a physical annealing process. In step 820, the schedule starts at a very high temperature. At this temperature, any permutation is possible regardless of its impact on the accuracy of the results. By staying in the high temperature longer, a more exhaustive search of the allowable search space will be performed, thus reducing the probability of being trapped in a local minimum. (See, for example, I. Lee, R. Sikora, and M. J. Shaw, "A Genetic Algorithm Based Approach to Flexible Flow Line Scheduling with Variable Lot Sizes," IEEE Trans. on System Man., Cybernetics, vol. 27, no. 1, Feb. 1997). In step 821, a random dimension table is selected. In step 822, using this dimension table, the data cube is generated and the accuracy of a data warehouse query is compared with a previous multi-resolution representation of the data cube. In step 823, if the accuracy is not improved, a probability of accepting the permutation as a function of the temperature is computed. When the temperature is high, the probability of accepting the permutation is also high. In step 824, a random number between 0 and 1 is generated. If the random number is less than the probability, the permutation is accepted. Otherwise, it will be rejected and a new permutation will be generated, in step 825. After step 825, the process continues at step 822. If in step 824, the permutation is accepted, or in step 822, the accuracy is improved, the process continues at step 826. In step 826, the temperature is lowered. As the temperature gradually decreases, the allowable possible permutations also decrease. As the temperature approaches unity, only those permutations which improve the accuracy will be allowed. In step 827, if the temperature is not equal to unity, a new permutation is generated, and the process continues at step 822. In step 827, if the temperature equals unity, (the simulated annealing results are identical to the heuristic algorithm of FIG. 8a) the process ends, in step 829.

The procedures described thus far do not preserve the boundaries in the FACT table. For example, in the averaging operations described with reference to FIG. 6, adjacent data points will be averaged regardless of a boundary. Examples of semantic boundaries that may need to be preserved are data within geographic, company, or product boundaries. For example, it may be undesirable to combine sales from bordering regions or states.

Figure 9:
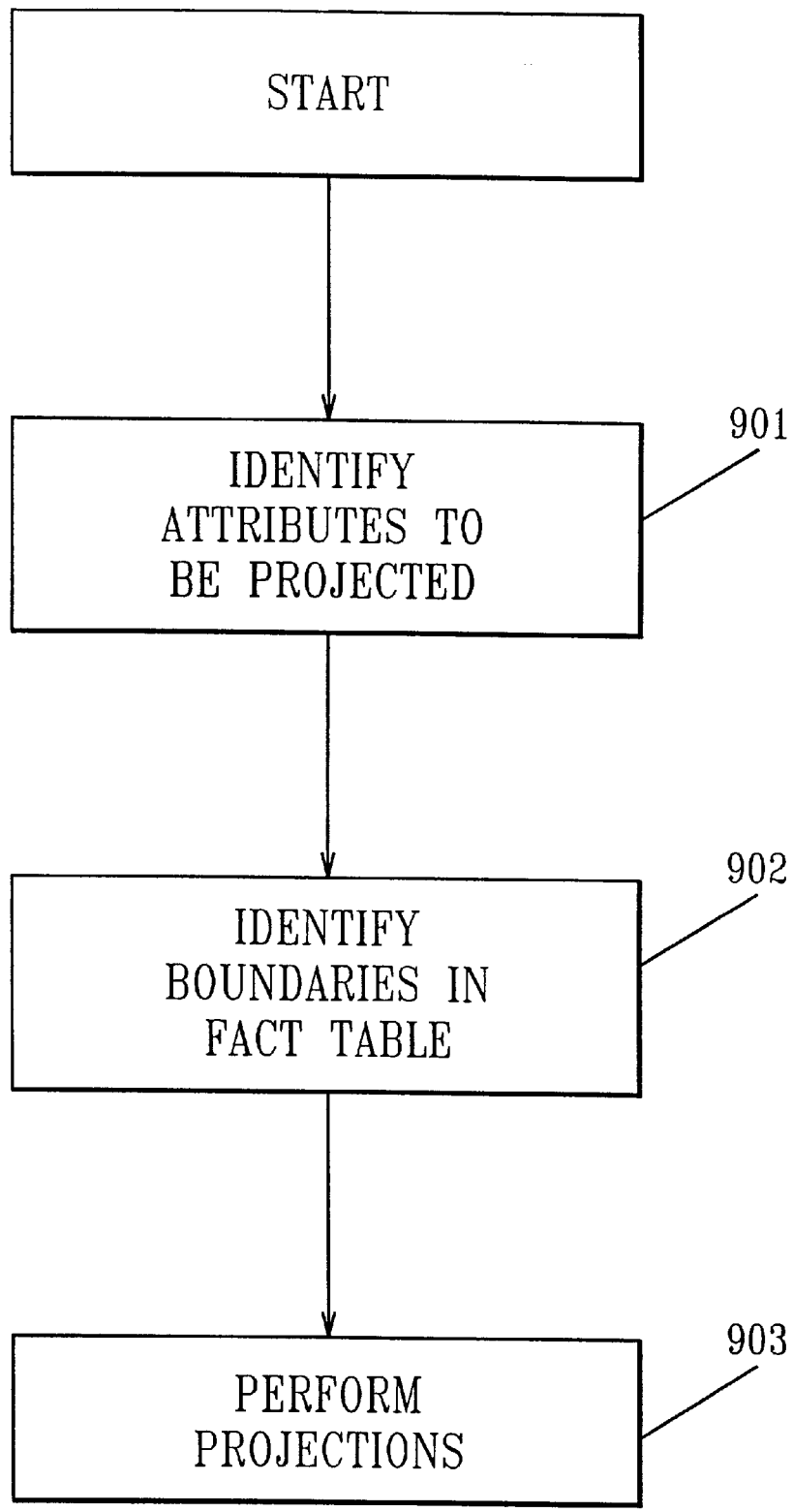
FIG. 9 depicts an example of a flow chart for preserving a semantic boundary when approximated versions of the databases are generated.

FIG. 9 depicts an example of a method for enforcing the preservation of a semantic boundary (this method can be used as an alternative to step 502 in FIG. 5). Here, a virtual boundary can be defined along specified semantic boundaries such that the transformation process will only occur within those boundaries. As depicted, in step 901, the attributes to be projected are identified. In step 902, the virtual boundaries to be preserved are identified. In step 903, the transformation process is then applied to data within the virtual boundaries. Note that the process of generating the data cube is identical to the previous case, except that the wavelet transformation process begins at one boundary and ends at another boundary. Previously, the wavelet transformation started at a first entry in the data cube and ended at a last entry of the cube. Note that the compression gained by going to a lower resolution is reduced due to the enforcement of the boundaries.

Now that the invention has been described by way of a preferred embodiment, with alternatives, various modifications and improvements will occur to those of skill in the art. Thus, it should be understood that the detailed description should be construed as an example and not a limitation. The invention is properly defined by the appended claims.

What is claimed is:

1. A computerized method of generating multi-representations of a data cube, comprising the steps of:
   splitting the data cube, which includes a plurality of lattice points, into a plurality of dimensions;
   generating representations selected from the group consisting of one or more of multi-resolutions and multi-projections, of one or more said dimensions of the data cube, in response to said splitting step; and
   reconstructing the data cube from said one or more of multi-resolutions and multi-projections, in response to said generating step.

2. The method of claim 1, comprising the steps of:
   said generating step comprising generating said multi-projections of the data cube;
   storing a reconstructed data cube including said multi-projections, in response to said reconstructing step.

3. The method of claim 2, for online analytical processing (OLAP), comprising the steps of:
   receiving a query on a reconstructed data cube at a selected resolution; and
   synthesizing the reconstructed data cube at said selected resolution, in response to said query.

4. The method of claim 1 for online analytical processing (OLAP), comprising the steps of:
   said generating step comprising generating said multi-projections; and
   synthesizing multi-resolutions of a reconstructed data cube; and
   storing said multi-resolutions of said reconstructed data cube.

5. The method of claim 1, comprising the step of querying a reconstructed data cube at a selected resolution.

6. The method of claim 1, wherein said reconstructing step further comprises the step of compressing each projection of the data cube.

7. The method of claim 1, wherein the data cube is a multi-dimensional table.

8. The method of claim 1, further comprising the steps of:
   iteratively mapping non-numeric attributes or numeric attributes in a database to other numeric attributes; wherein each mapping includes the steps of:
   synthesizing the data cube at a selected resolution;
   querying the reconstructed data cube at the selected resolution; and
   computing and comparing an error between the selected resolution and a previous resolution, in response to said querying step; and
   selecting a mapping wherein the error is minimized.

9. The method of claim 8, further comprises the step of:
   computing a probability for the mapping as a function of a control parameter, if the error is increased in response to said computing and comparing step; and
   accepting the mapping as a random function of the probability.

10. The method of claim 1, wherein said generating step further comprises the step of preserving the relative spatial integrity of the lattice points.

11. The method of claim 10, wherein said generating step further comprises the steps of:
    said generating step comprising generating said multi-projections of the data cube;
    identifying boundaries of the data cube; and
    generating approximated versions of the data cube while preserving the boundaries thereof.

12. The method of claim 1, wherein said reconstructing step comprises the steps of:
    selecting lattice points in the data cube;
    applying one of histograms, aggregations, min, max, and wavelet operators to selected lattice points in the data cube to generate new values; and
    storing the new values, in response to said applying step.

13. The method of claim 1, wherein said generating step further comprises the steps of:
    generating said-multiple projections of the data cube by applying linear or nonlinear functions to the data cube; and storing the multiple projections in a memory for subsequent synthesis.

14. The method of claim 1, wherein the data cube is generated from a relational table or object-relational table in a relational database, further comprising the steps of:
    mapping non-numeric or numeric data in the database into another numeric representation;
    translating the relation table into a FACT table, in response to said mapping step;
    decomposing the FACT table into multiple FACT tables with a single dependent variable;
    generating multiple projections of each FACT table;
    synthesizing multiple representations of the FACT table from the multiple projections;
    applying one or more of histogram, aggregations, min, max, and wavelet operators to the multiple representations; and
    selecting one of the multiple representations for computing a specific query as a function of a user-specified tolerance.

15. A data structure, instantiated in a memory of a computer, said data structure generated according to the method of claim 1.

16. A computer program product tangibly embodying a program of instructions executable by a computer for generating, multi-representations of a data cube, said method comprising the steps of:
    splitting the data cube, which includes a plurality of lattice points, into a plurality of dimensions;
    generating representations selected from the group consisting of one or more of multi-resolutions and multi-projections, of one or more said dimensions of the data cube, in response to said splitting step; and
    reconstructing the data cube from said one or more of multi-resolutions and multi-projections, in response to said generating step.

17. The computer program product of claim 16, comprising the steps of:
    said generating step comprising generating said multi-projections of the data cube;
    storing a reconstructed data cube including said multi-projections, in response to said reconstructing step.

18. The computer program product of claim 17 for online analytical processing (OLAP), comprising the steps of:
receiving a query on the reconstructed data cube at a selected resolution; and
synthesizing the reconstructed data cube at said selected resolution, in response to said query.

19. The computer program product of claim 16 for online analytical processing (OLAP), comprising the steps of:
said generating step comprising generating said multi-projections; and
synthesizing multi-resolutions of a reconstructed data cube; and
storing said multi-resolutions of said reconstructed data cube.

20. The computer program product of claim 16, comprising the step of querying a reconstructed data cube at a selected resolution.

21. The computer program product of claim 16, wherein said reconstructing step further comprises the step of compressing each projection of the data cube.

22. The computer program product of claim 16, wherein the data cube is a multi-dimensional table.

23. The computer program product of claim 16, further comprising the steps of:
iteratively mapping non-numeric attributes or numeric attributes in a database to other numeric attributes; wherein each mapping includes the steps of:
synthesizing the data cube at a selected resolution;
querying the reconstructed data cube at the selected resolution; and
computing and comparing an error between the selected resolution and a previous resolution, in response to said querying step; and
selecting a mapping wherein the error is minimized.

24. The computer program product of claim 23, further comprises the step of:
computing a probability for the mapping as a function of a control parameter, if the error is increased in response to said computing and comparing step; and
accepting the mapping as a random function of the probability.

25. The computer program product of claim 16, wherein said generating step further comprises the step of preserving the relative spatial integrity of the lattice points.

26. The computer program product of claim 25, wherein said generating step further comprises the steps of:
said generating step comprising generating said multi-projections of the data cube;
identifying boundaries of the data cube; and
generating approximated versions of the data cube while preserving the boundaries thereof.

27. The computer program product of claim 16, wherein said reconstructing step comprises the steps of:
selecting lattice points in the data cube;
applying one of histograms, aggregations, min, max, and wavelet operators to selected lattice points in the data cube to generate new values; and
storing the new values, in response to said applying step.

28. The computer program product of claim 16, wherein said generating step further comprises the steps of:
generating said multiple projections of the data cube by applying linear or nonlinear functions to the data cube; and storing the multiple projections in a memory for subsequent synthesis.

29. The computer program product of claim 16, wherein the data cube is generated from a relational table or object-relational table in a relational database, further comprising the steps of:
mapping non-numeric or numeric data in the database into another numeric representation;
translating the relation table into a FACT table, in response to said mapping step;
decomposing the FACT table into multiple FACT tables with a single dependent variable;
generating multiple projections of each FACT table;
synthesizing multiple representations of the FACT table from the multiple projections;
applying one or more of histogram, aggregations, min, max, and wavelet operators to the multiple representations; and
selecting one of the multiple representations for computing a specific query as a function of a user-specified tolerance.

* * * * *